United States Patent Office 3,663,720
Patented May 16, 1972

3,663,720
ARTICLE OF MANUFACTURE HAVING HIGH
TEMPERATURE RESISTANT PROPERTIES
AND METHOD OF MAKING THE SAME
Henry C. Thompson, Saratoga, Calif., assignor to Thompson Chemicals, Inc., San Carlos, Calif.
No Drawing. Original application Sept. 10, 1965, Ser. No. 486,528, now Patent No. 3,502,610. Divided and this application Sept. 12, 1969, Ser. No. 871,054
Int. Cl. B44d 1/14
U.S. Cl. 117—70 R        3 Claims

ABSTRACT OF THE DISCLOSURE

The invention relates to making a high temperature resistant glass fiber laminate by impregnating glass fibers with a condensation product of resorcinol and formaldehyde resins containing between 2 and 6 based in the weight of the condensation product of portland cement. A coating of an enamel alkyd may be applied to the glass fiber laminate.

CROSS-REFERENCES TO RELATED APPLICATIONS

This application is a division of application Ser. No. 486,528, filed Sept. 10, 1965, now Pat. No. 3,502,610.

This invention relates to a synthetic resin composition, method and manufacture that is safe and easy to handle and has excellent high temperature properties. More particularly, the invention relates to resorcinol-formaldehyde resin systems.

The growth of the plastics industry has been limited to some extent by the combustion and temperature limitations of the majority of synthetic resins. That is, a large number of synthetic resins burn quite easily while others, though they may not sustain flame, decompose at relatively low temperatures. For example, the combination of synthetic resins and glass fibers has enjoyed enormous growth within the limitations of the synthetic resins used. Polyester resins in combination with glass fibers result in a product which is extremely strong, durable and resistant against corrosion. However polyester-glass fiber products burn easily without the incorporation of certain chemicals, such as chlorides, which will not support combustion in themselves. Even with non-burning additives, polyester resins will burn while being subjected to flame. Only when the flame is removed will they stop burning.

Another problem with many synthetic resins, including polyester resins is that certain solvents and chemicals are required in the manufacture of them which present hazards in themselves. Some of the required chemicals and solvents are toxic, while others are flammable or even explosive. Consequently, the handling costs in manufacturing and using such resins are substantial.

Although certain synthetic resins have been proposed which are self extinguishing, many lose strength at relatively low temperatures, such as below 300° F. Substantially all polyester resins lose most of their strength at a temperature below 300° F.

Resorcinol-formaldehyde resin systems have been known to possess desirable properties: room temperature cure, non-burnable, no burnable solvents, high temperature strength, etc. Nevertheless, resorcinol-formaldehyde systems have not enjoyed success outside the wood adhesive field because of an inability to satisfactorily mold, coat, or impregnate with this resin. As stated in "Glass Reinforced Plastics" edited by Phillip Morgan (Interscience Publishers, New York, 1954), "Resorcinol resins have not shown up well in bonding glass fibers, one of the principal disadvantages being the high water absorption figures and reduction in tensile strength after 24 hours immersion."

It is an object of the invention to provide a novel composiiton, method and manufacture which will overcome the defects and disadvantages pointed out above.

Additional objects of the invention will appear from the following description in which the preferred embodiments of the invention have been set forth in detail.

I have discovered that condensation products of polyhydric phenolic compounds and aldehydes may be improved with the addition of small amounts of hydraulic cement.

The term "polyhydric phenolic compound" is used generically to cover polyhydric phenols per se, such as resorcin, catechol and hydroquinone, and their substitution products and derivatives having three unsubstituted benzene ring positions and which will react with aldehydes to produce permanently fusible resins that are low temperature reactive. Examples of other dihydric phenolic compounds are cresorcin and orcin. The phenolic compounds are divided into the monohydric compounds, the dihydric compounds, and the trihydric compounds. While the permanently fusible resins herein set forth are primarily derived from the dihydric phenolic compounds, the trihydric phenolic compounds or copolymerization products of mono, di, and trihydric phenols may be used. The resins are formed by the condensation of the hydroxy radical with the aldehyde radical. Derivatives of polyhydric phenolic compounds, such as low alkyl ethers, may be used for condensation with the aldehyde, although generally with reduced reactivity and water solubility.

The preferred polyhydric phenolic compound is resorcinol which may be reacted in the absence of a catalyst with an aldehyde such as formaldehyde. Commercially available resorcinol often contains small amounts of aliphatic alcohols which are not detrimental to the operation of the present invention. However, in order to decrease the fire hazard, burnable alcohols may be removed without adversely affecting the condensation product.

A monohydric phenolic compound such as phenol may be used to extend the polyhydric phenolic compound where high performance requirements are not present. As the percentage of phenol or related monohydric phenolic compound increases, the burning capacity of the resin correspondingly increases together with the curing temperature required and the need for catalyst. Up to 15% phenol is acceptable if high heat resistance is not required.

A single aldehyde may be reacted with any of the phenolic compounds above set forth, or the aldehyde reacting medium may be a mixture of aldehydes as, for example, formaldehyde and acetaldehyde. Dialdehydes, such as glyoxal, may also be employed as the source of aldehyde.

Paraformaldehyde is the preferred source of aldehyde because of its low water content. However, Formalin may also be used to provide formaldehyde. When a formaldehyde solution is used as the aldehyde source, a more flexible product is obtained than when paraformaldehyde is used.

Furfuraldehyde may also be used as the source of aldehyde with highly satisfactory results. When furfuraldehyde is the source of aldehyde, an apparently tougher and more heat resistant product results. The produce withstands temperatures approximately 100° F. higher than a comparable product made with paraformaldehyde.

The condensation of the polyhydric phenolic compound and the aldehyde produces water in addition to the resin.

The water of condensation serves to set the hydraulic cement also included in the composition.

The term "hydraulic cement" is used in the specification to include those inorganic cements which harden by the addition of water. The preferred hydraulic cements are the various kinds called portland cement. I have found that silicate containing cements are superior to those which do not contain silica in combined form. Accordingly, even silica flour may be used in the present invention as well as other sources of silica gel. Aluminous cements may also be used, as well as natural cements. Gypsum cements, such as plaster of Paris, Keene's cement, etc. are less suitable for use in the invention as the hydraulic cement because of the lack of silica or silicate ion.

As is well known, portland cements are composed chiefly of three oxides: silica ($SiO_2$), lime (CaO), and alumina ($Al_2O_3$), with small quantities of MgO, $SO_3$, and $Fe_2O_3$ also present. Four principal compounds are recognized in portland cement. They are: tricalcium silicate $$3CaO \cdot SiO_2$$

dicalcium silicate ($2CaO \cdot SiO_2$); tricalcium aluminate ($3CaO \cdot Al_2O_3$); and tetracalcium aluminoferrite $$4CaO \cdot Al_2O_3 \cdot Fe_2O_3$$

These four compounds are combined into various proportions to form the five generally recognized types of portland cement. These five types are defined by the American Society for Testing Materials in ASTM C 150–61. While all five types of portland cement may be used to advantage in the instant process, type II is preferred. In fact, various combinations other than the five defined types of cement may be used. That is, additives and variations in the proportions may be accommodated to meet the particular and specification intended. Changes may be incorporated into the cement formulation to control the rate of setting, the ultimate strength, the heat of hydration, the volume stability and the durability of the cement. The art of manufacturing portland cement is well developed and documented in the literature, for example, "The Portland Cement and Asphalt Concretes" by Thomas D. Larsen, McGraw-Hill, 1963.

Depending upon the reactivity of the hydraulic cement, between about 2 and 6% hydraulic cement, based on the weight of the resin, should be added. Greater amounts of cement accelerate the hardening of the composition and thereby shorten the pot life. While citric acid or other retardant to polymerization may be added, it is preferable to maintain the amount of cement below 6%. Greater amounts, when used, simply produce a quick setting of the cement without any increase in strength. By employing the cement within the preferred range, the resulting composition is substantially stronger than the cement alone.

The strength of the polyhydric phenol-formaldehyde resin when combined with 2 to 6% cement has an average flexural strength of 15 to 20,000 pounds per square inch. The flexural strength goes as high as 27,000 pounds per square inch or higher, with the tensile strength being as high as 30,000 pounds per square inch. In contrast, portland cement alone generally has a strength less than 10% of my new composition. Moreover, the combination of cement and resin produces a composition stronger than either of the ingredients alone. That is, my improved composition provides flexural strength and tensile strength greater than that of resorcinol-formaldehyde systems generally.

The amount of cement that may be added to the polyhydric phenolic resin system varies with the reactivity of the cement. At least 2% cement is required in order to obtain the desirable properties of the resultant composition. I have found that a presence of the cement serves as a viscosity depressant in the resin system. This result is surprising because the powdery nature of the added cement would be expected to increase viscosity.

It is not precisely understood why the viscosity of the resin-cement is lowered. Such a reduction in viscosity occurs only within rather narrow limits, depending upon the precise resin used, the hydraulic cement used and the various additives employed. If a large quantity of portland cement, say 20% is added to resorcinol formaldehyde resin, the whole mass heats up and solidifies into an unmoldable mass. Greater than 4% portland cement thickens resorcinol-formaldehyde resin and less than 3% produces a lesser effect on the viscosity. Under 2% hydraulic cement provides no benefit and is negligible in effect on the ability of the resin to saturate fibers.

On the other hand, the presence of more than about 10% cement reduces the strength of the mixture substantially. In addition, the composition sets up so rapidly that it is difficult to handle and use. One of the principal advantages of the present invention is the ease of handling of the aqueous non-burnable system. Between 2 and 6% cement, based on the weight of the resin, is generally necessary to obtain the improved properties described above.

The preferred amount of cement in the composition is between about 3 and 4%, based on the weight of the resin. This amount furnishes an easily handled, non-burnable composition which is adaptable to a large number of uses. Where the cement used is fresh and particularly reactive, 3% is generally the optimum amount. However, with less reactive types of cement and with cement which is not as fresh, 4% cement is generally the optimum amount.

A number of additives may be included in the resin composition depending on the uses contemplated. Thus, where the composition is used as a molding resin, the existence of fibrous materials is particularly desirable. Cottonseed hulls, nylon fibers, wood fibers, glass fibers, etc. are well adapted to be used with the resin-cement combination. Not only do these fibrous materials extend the resins, they serve to decrease the brittleness of the hardened resin.

A traditional problem with resorcinol-formaldehyde resin systems has been their inability to wet fibrous materials. However, the presence of cement in the composition of the present invention serves to lower viscosity and increase the wetting power of the resin system so that it will saturate the fiber and produce a strong bond with the fibers.

The presence of fibrous material, while not mandatory, serves to control the shrinkage of the resin and to prevent cracking or crazing of the resin when molded.

Other additives such as calcium carbonate, talc, wood flour, and similar fillers may be added if desired. However, many fillers are burnable, so that the non-burning characteristics of the composition of the present invention are reduced by the addition of burnable fillers.

Commercially available formaldehyde and paraformaldehyde often contains wood flour. It is preferable to use paraformaldehyde without wood flour, but small amounts of the filler are acceptable where the anticombustion properties of the resin-cement combination are not as critical.

A graphite powder may conveniently be added to the resin composition of this invention to impart a flexible property to the cured product. In some applications, the added flexibility is desirable. In addition, the graphite powder serves as an extender without adversely affecting other properties of the composition. The high heat resistance of graphite is also an important property for use in some applications. Generally speaking, between 20 and 40 percent to added graphite powder is necessary to add flexibility to the cured product. However, lesser amounts may be used to extend the resin. Greater than 40 percent may also be added, although the increase in flexibility is negligible.

The resin composition of the present invention may be utilized in many basic manufacturing processes. For example, conventional extrusion equipment may be used to provide soil pipe which is competitive in price to drain tile and Orangeburg. Extrusion equipment can also produce underground conduits for either electrical purposes or otherwise. Also, ducts for either hot air or cold air may be extruded using conventional equipment with the present resin composition. For the building trades, the extrusion equipment can produce window sills, door frames, door jambs, etc.

Conventional wrapping and forming equipment can produce armor coating which is fireproof, weatherproof, and chemically resistant for use on insulated hot water pipes and insulated cold water pipes.

A number of techniques may be employed for applying the resin to pipe. Thus, a pipe length may be wrapped with a Fiberglas sheet which is saturated with the resin. By rotating the pipe over a continuous feed line of saturated glass mat or cloth, a carefully controlled layer of reinforced resin composition is applied to the pipe.

Moreover, conventional spray guns may be employed for spraying chopped glass fibers and resin mixture onto a rotating pipe. When the coating on the rotating pipe becomes firm, the coating may be cured either in air or in an oven.

A further pipe coating technique that may be used to advantage involves wrapping the pipe with Fiberglas filaments, mat, or cloth, and thereafter rotating the covered pipe on a roller which is saturated with the resin composition of this invention. The composition of the present invention may be sprayed or coated onto a variety of surfaces, including a revolving length of pipe or flat surfaces.

The interior surfaces of pipes may also be conveniently coated with the present composition by depositing a predetermined amount of resin and cement mixture on a rapidly revolving pipe. The centrifugal force of the pipe spreads the resin mixture on the interior surface and permits curing to a hard resistant, fireproof coating.

Conventional equipment used for continuous pull-trusion may be used with resin composition of this invention in the continuous production of gutters, downspouts and flashings. Pull-trusion is known in the resin forming arts as the pulling of resin shapes through extrusion dies by external means, as opposed to pushing in extrusion processes.

Additionally, the resin composition may be used with conventional low pressure molding equipment in the production of such building trade items as shower stalls and floor pans for shower stalls.

The composition of the invention may be used with conventional spray and color coating equipment to produce monolithic roofing and skins for insulation. The non-burning characteristics of the resin adds greatly to the utility of the resin in this regard. Waterproofing coatings on porous plaster and rigid wall surfaces is also contemplated with the resin composition.

Conventional pressure molding equipment may be used in the manufacture of auto bodies and truck cabs, using glass fibers impregnated with the resin composition.

Because of the high thermal resistance and non-burning characteristics of the resin composition, products produced with this resin can be heated to temperatures enabling the use of heat baked enamels. Thus, products can be coated with vitrified melt finishes either over bodies molded of the resin composition or coated with the resin composition.

It is also possible to foam the resin of the instant invention whereby a self-contained hard outer skin is formed. The resultant product is a fire resistant foam. Conventional Freon may be used in an amount between about 3% to 5% to form a product having a density between about 4 to 40 pounds per cubic foot. The variation in density may be obtained by using different fillers. For example, calcium carbonate may be used to produce a denser product than in the case where cottonseed flour is used as the filler. In addition, a foam may be obtained by pumping Freon into a resin-cement composition using standard mixing equipment for producing polyurethane foams. In this case, the Freon may be injected through the low pressure tube used for catalyst injection. It is believed that the cement additive is responsible for the hard impervious smooth skin which results when the composition is foamed or expanded.

The resin is particularly well adapted for use with glass fibers. When so used, the resultant product may be heated to the point at which aluminum melts without having any disintegration of the resin-glass fiber combination. In contrast, polyester resin-glass fiber combinations disintegrate and burn at relatively low temperatures, such as 300° F.

The table is illustrative of the thermal stability of glass fiber-resin laminates produced by the present invention.

TABLE

75°–450°: No degradation
500°–600°: Slight surface char
600°–750°:
    (a) No smoke
    (b) Unpleasant odor similar to the thermal decomposition of phenolic or formaldehyde resins
    (c) Char increasing only slightly
    (d) No softening
750°–800°:
    (a) Penetration of char increasing significantly
    (b) No flame or smoke
    (c) Some softening
    (d) Pungent odor still noticeable
800°–825°: Sample first to red heat-decomposition and charring proceeded quickly from this point
825°–850°: ½ of sample to red heat-decomposition and charring proceeded quickly from this point
850°–900°:
    (a) ¾ of sample to red heat still some structural stability exists
    (b) Odor gone
900°–950°: Sample entirely to red heat gross warping
950°–1000°:
    (a) Sample quite soft and pliable. Resin destruction complete Notes (a) 62% of the laminated material was lost upon treatment to 1,000° F. This was accomplished with the complete absence of any type of self-supporting flame and/or smoke problem.

(b) The odor was due to the decomposition of the organic constituents.

The materials tested for the table were glass fiber laminates impregnated with phenol-modified resorcinol-formaldehyde resin containing 4% of a type portland cement The glass fibers were in the form of chopped rovings in one sample and in the form of glass cloth in a second sample forming the basis of the test results of the table.

While I do not wish to be bound to any particular theory I believe that the hydroxy groups of the resorcinol or other polyhydric phenolic compound react with the portland cement which, in turn, is set by the water present in the resorcinol resin system. Such a small quantity of cement is present that no appreciable heat is produced to cure the resin. In the process of hydration of the cement, the tricalcium silicate hydrolizes, forming calcium hydroxide and a certain amount of silica gel plus dicalcium silicate. Setting occurs by crystallization of the solution formed from the hydrations products of the calcium silicates and aluminates. Gypsum is often present to prevent solution of the tricalcium aluminate which would produce high heat of hydration and flash set the cement with a resultant weak bond.

EXAMPLE 1

A phenol modified resorcinol known commercially as Koppers "Penacolite 4122" was placed in a "Jiffy" type mixer and 4%, based on the weight of the resorcinol, Trinity white portland cement was stirred into the resin. Paraformaldehyde was then added in an amount equal to 20% of the weight of the phenol modified resorcinol. Then 20% by weight of silica flour was stirred into the mixture. Layers of glass fiber cloth were saturated and the whole molded under slight pressure at 200° F. The resulting laminate containing 60% glass fiber was strong and stiff when heated to red heat and did not burst into flame or produce smoke.

The resin described above without the addition of the portland cement will not absorb the silica flour and is not sufficiently liquid to saturate the glass fibers. The glass remains dry and a solid molded product does not result.

EXAMPLE 2

The procedures outlined in connection with Example 1 were followed except for the use of a 37% formaldehyde solution in water (formalin). Molding with glass fibers under the same conditions produced a more flexible product than when paraformaldehyde was used.

EXAMPLE 3

The procedure described above in connection with Example 1 was followed except that the 4% of the portland cement was mixed with paraformaldehyde instead of with the phenol modified resorcinol. By mixing the portland cement with the paraformaldehyde, reaction between the cement and resorcinol is avoided. Thereafter, the mixture of paraformaldehyde and portland cement was combined with the resorcinol and silica flour, and the mixture was molded with glass fiber as in Example 1. No difference was detected in the final result. The strength and flame-resistant properties of the final product were the same as in Example 1 with an added benefit of increased shelf life.

EXAMPLE 4

A mixture of phenol modified resorcinol (Penacolite 4122) and 3% Trinity white portland cement were thoroughly mixed and divided into a three samples. To the first sample was added 10% cottonseed hull flour. To the second sample, 20% cottonseed hull flour was added. To the third sample, 30% cottonseed hull flour was added. Paraformaldehyde was added in an amount equal to 20% of the weight of the phenol modified resorcinol. The three samples were then molded into solid blocks and cured at 200° F. The three blocks were nearly identical in appearance and properties and differed primarily in the density of the solid product. None of the three samples would burn with a match held to it.

EXAMPLE 5

The composition described in Example 1 for impregnating glass fibers was used in this example without the cloth. The composition, including the silica flour filler, was placed between two sheets of "Mylar" polyester film, 2 mils thick. Air bubbles were mechanically removed from under the Mylar film and the sandwich of film and resin composition was pulled through a warmed mold. Initially, the sandwich was placed on the mold until the resin composition hardened. Thereafter, the hardened portion of the sandwich was pulled through the mold, which was maintained at about 200° F., so that the soft sandwich part progressed through the mold and hardened. The Mylar film was readily stripped from the hardened composition and a strong, fireproof resin product was obtained.

EXAMPLE 6

A sheet of molded glass fibers impregnated with the resin composition according to the procedure described in Example 1 was employed as the starting material in this example. The sheet was coated with an alkyd primer and baked at 400° F. to cure the primer coating. Then, a baked enamel alkyd finish coating was sprayed on the primed sheet and the twice-coated sheet was placed in an oven and heated by means of infrared lamps at a temperature of 450° F. The resultant product had a smooth baked enamel finish over the glass fiber sheet. This example illustrates that auto bodies and appliances may conveniently be coated with conventional high temperature baked alkyd systems.

EXAMPLE 7

A phenol modified resorcinol resin (Penacolite 4122) was mixed with 4% Trinity white and 20% paraformaldehyde as in Example 1. 20% silica flour was also added and mixed thoroughly into the composition. Then 3½% Freon 118 was introduced into the mixture. The whole mass was poured into a mold and heated to about 100° F. The foam expanded and hardened within five minutes with an exotherm temperature of 150° F. was reached. A very strong foam of 20-pound density was produced which had a smooth surface on both the exposed surface and on the mold surface.

The resin composition of the present invention is safe and convenient to handle because no toxic chemicals are involved, no burnable components need be present, and the composition cures at room temperature. The high strength of the resin composition is retained even to extremely high temperatures, whereby the resin composition may be used in many applications where plastic materials could not previously be used.

I claim:

1. An article of manufacture comprising a substrate coated with a condensation product of a polyhydric phenolic compound and an aldehyde containing between 2 and 6% based on the weight of the condensation product of hydraulic cement.

2. In a method of coating fire-proof articles made of glass fibres, comprising the steps of placing glass fibres in the desired configuration, impregnating the fibres with a composition comprising a condensation product of a polyhydric phenolic compound and an aldehyde and between 2% and 6%, based on the weight of the condensation product, of hydraulic cement, and thereafter curing to produce a shaped fibreglass article.

3. In a method of coating a substrate, the steps of applying a first coating comprising a condensation product of a polyhydric phenolic compound and an aldehyde containing between 2% and 6%, based on the weight of the condensation product, of hydraulic cement, curing said first coating, and thereafter applying an enamel alkyd second coating.

References Cited

UNITED STATES PATENTS 2,653,891  9/1953  Gentle et al. ___ 117—161 L X
3,216,966  9/1964  Collins _____ 106—90 X ALFRED L. LEAVITT, Primary Examiner C. K. WEIFFENBACH, Assistant Examiner U.S. Cl. X.R.

106—15 FP, 90; 117—126 GQ, 126 GB, 126 GF, 137, 161 L; 260—38